Figure 5:
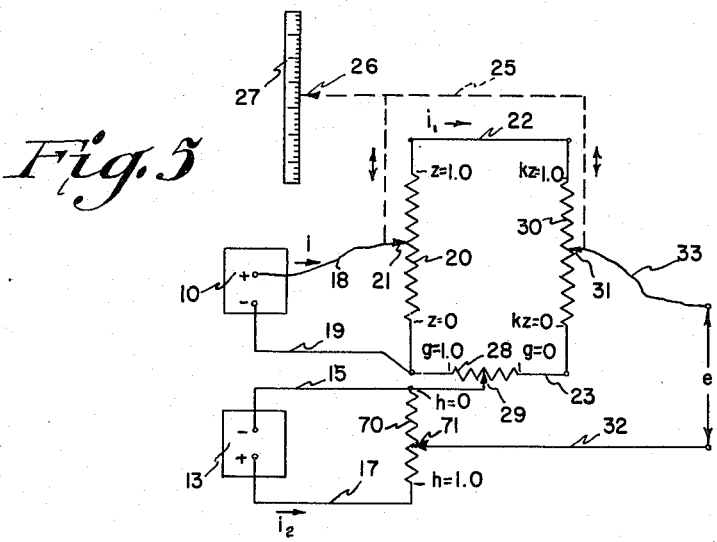

May 27, 1958 P. C. HOELL 2,836,357
COMPUTING MEASURING APPARATUS
Filed Jan. 26, 1953 8 Sheets-Sheet 1
*Fig. 1*
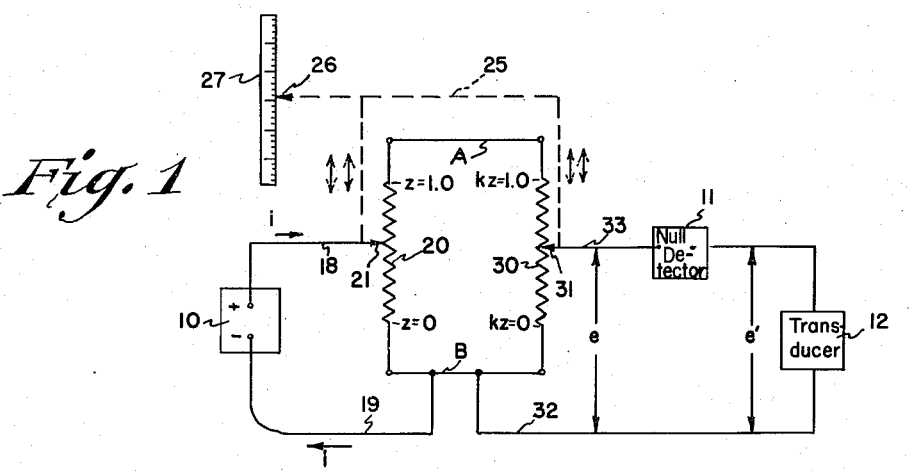
*Fig. 2*
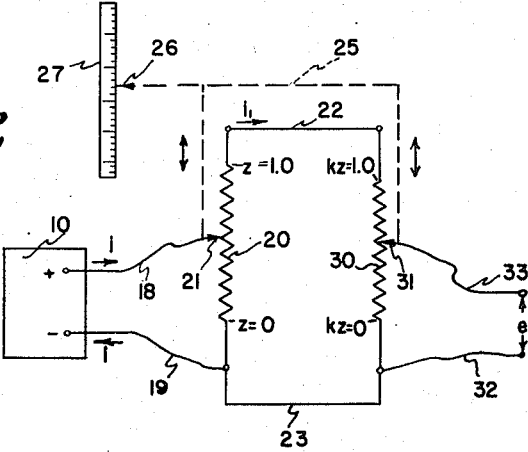
*Fig. 3*
INVENTOR
PAUL C. HOELL
Harry J. McCauley
BY
ATTORNEY INVENTOR
PAUL C. HOELL
BY *Harry J. McCauley*
ATTORNEY

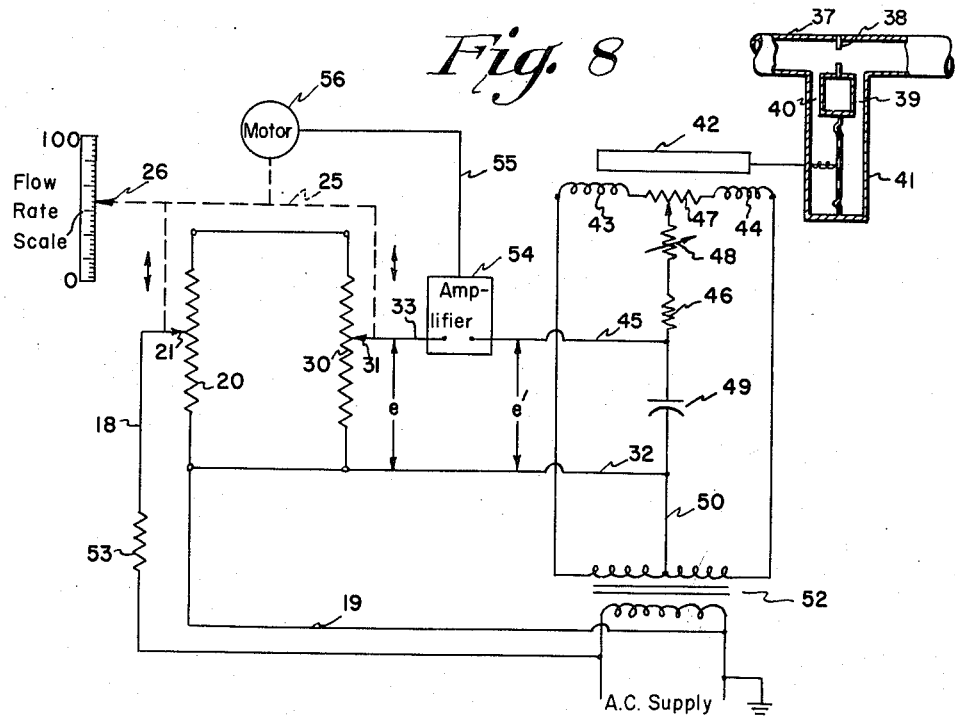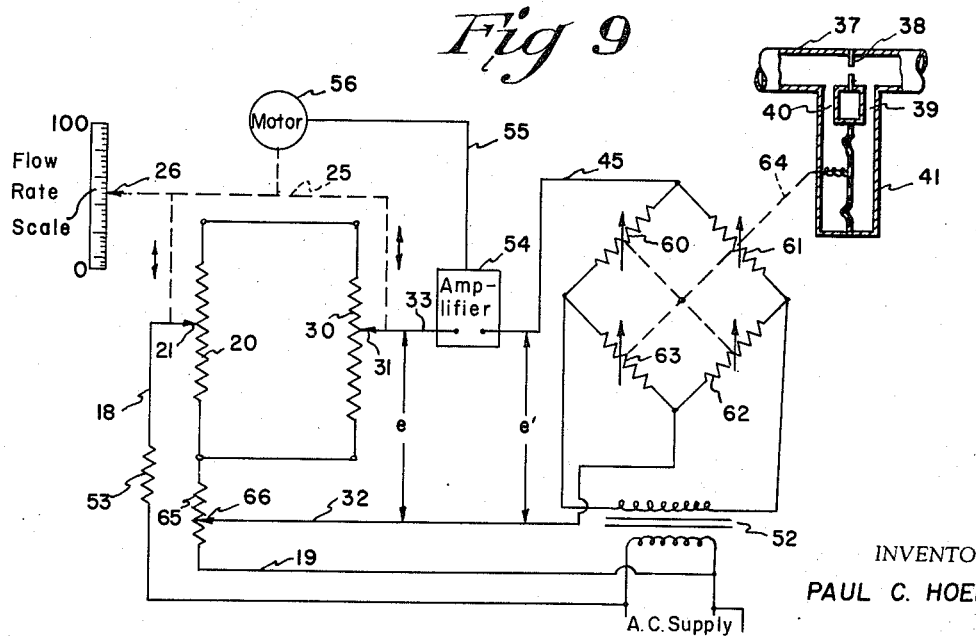

May 27, 1958    P. C. HOELL    2,836,357
COMPUTING MEASURING APPARATUS
Filed Jan. 26, 1953    8 Sheets-Sheet 5
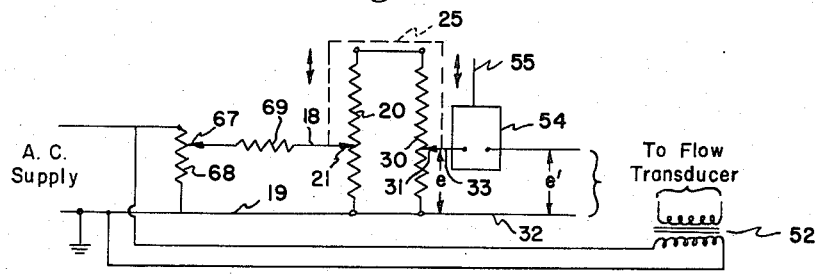
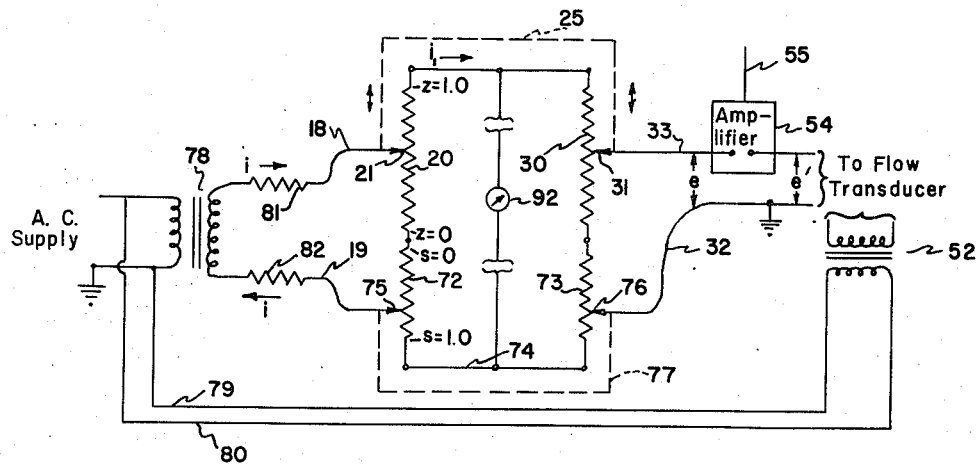
INVENTOR
PAUL C. HOELL
BY   *Harry J. McCauley*
ATTORNEY May 27, 1958      P. C. HOELL      2,836,357
COMPUTING MEASURING APPARATUS
Filed Jan. 26, 1953      8 Sheets-Sheet 6

INVENTOR
PAUL C. HOELL

BY    Harry J. McCauley

ATTORNEY

May 27, 1958   P. C. HOELL   2,836,357
COMPUTING MEASURING APPARATUS
Filed Jan. 26, 1953   8 Sheets-Sheet 7

INVENTOR
PAUL C. HOELL
BY *Harry J. McCauley*
ATTORNEY

May 27, 1958 P. C. HOELL 2,836,357
COMPUTING MEASURING APPARATUS
Filed Jan. 26, 1953 8 Sheets-Sheet 8

INVENTOR
PAUL C. HOELL

BY Harry J. McCauley

ATTORNEY

United States Patent Office 2,836,357
Patented May 27, 1958

2,836,357

COMPUTING MEASURING APPARATUS

Paul C. Hoell, Concordville, Pa., assignor to E. I. du Pont de Nemours and Company, Wilmington, Del., a corporation of Delaware Application January 26, 1953, Serial No. 333,307

8 Claims. (Cl. 235—61)

This invention relates to a computing measuring apparatus and particularly to an electrical computing measuring apparatus for the determination of phenomena where the magnitude of a transducer-derived E. M. F. representative of the phenomena varies as a quadratic function of the phenomena.

A great many phenomena are capable of evaluation by perception of an E. M. F. $e'$, equal to $y$, which varies as a quadratic function of the phenomenon $x$ under investigation according to the general relation $$y = ax^2 + bx + c$$

where $a$, $b$ and $c$ are constants. Typical examples of such phenomena comprise the relationship of the flow of fluids to the output E. M. F. developed by a commercial linear electrical differential pressure transducer in response to the pressure differential created by the passage of the fluid through a restriction such as an orifice or venturi, and the relationship of the generated E. M. F. of a thermocouple with respect to the temperatures to which it is exposed, it being recognized that while these examples are probably of the greatest practical importance they are not exclusive of the many phenomena which conform to the same basic mathematical mode. The measurement of the values of such phenomena is rendered difficult because of the requirement that a second order calculation must be performed either manually or with the aid of complicated devices, or the phenomena must be gaged by reference to special non-linear indicating charts and scales. Neither of these solutions of the problem is particularly satisfactory, especially from the standpoints of flexibility in measuring different quadratic functions, or in the achievement of scale-zero suppression.

An object of this invention is to provide an improved electrical computing measuring apparatus for the determination of phenomena where a transducer-derived E. M. F. representative of the particular phenomenon under evaluation varies as a quadratic function of the phenomenon.

Another object of this invention is to provide an electrical computing measuring apparatus for the purposes stated possessing scale linearization.

Another object of this invention is to provide an electrical computing measuring apparatus adapted to the indicating or recording on a single linear chart or scale of a multiplicity of physical variables in sequence, at least one of which variables is a quadratic function while the remainder may be linear.

Another object of this invention is to provide an electrical computing measuring apparatus for the measurement of the product of two phenomena including, as a specific type, a heat transfer rate meter.

A further object of this invention is to provide an electrical computing measuring apparatus for the purposes stated which is adapted to the transmission of an electrical signal to a remote receiver without the necessity for auxiliary intermediate equipment.

Other objects of this invention comprise the provision of an electrical computing measuring apparatus for the purposes stated which obviates non-linear linkages and slidewires, which is substantially free of error due to the variable contact resistance of movable contacts in low resistance measuring circuits, which has a calibration independent of the measuring signal source resistance, and which is adapted for use in conjunction with linearly functioning servo-mechanism process control apparatus.

The manner in which these and other objects of this invention are attained will be apparent from the detailed description and the following drawings.

Figure 6:
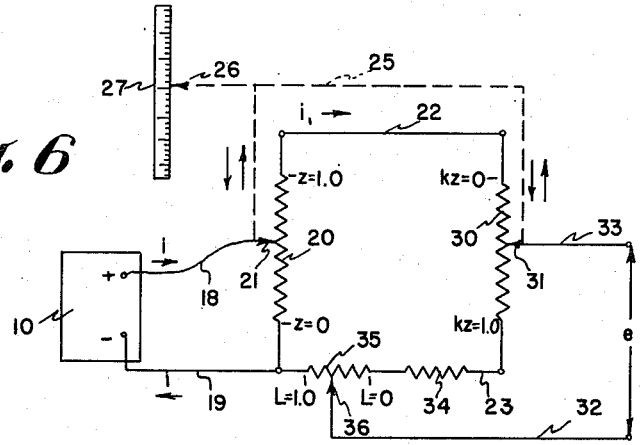
Figure 4:
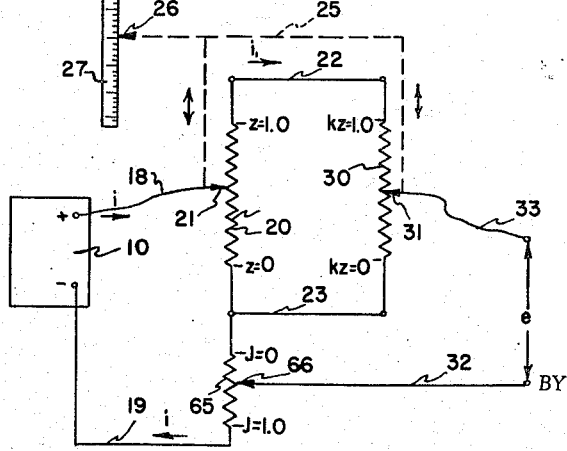
Figure 7:
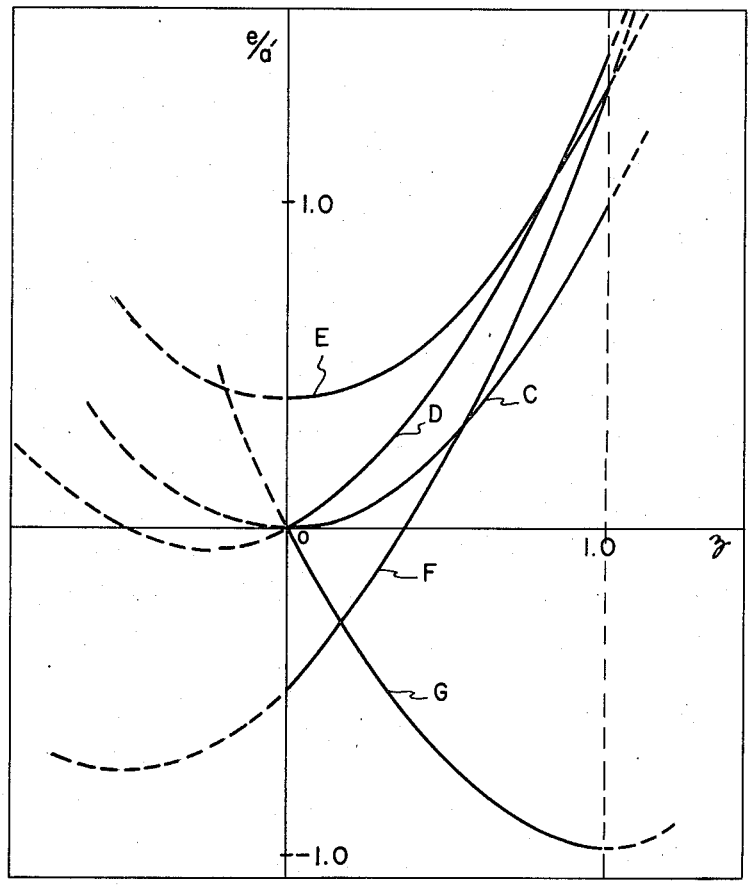
Figure 12:
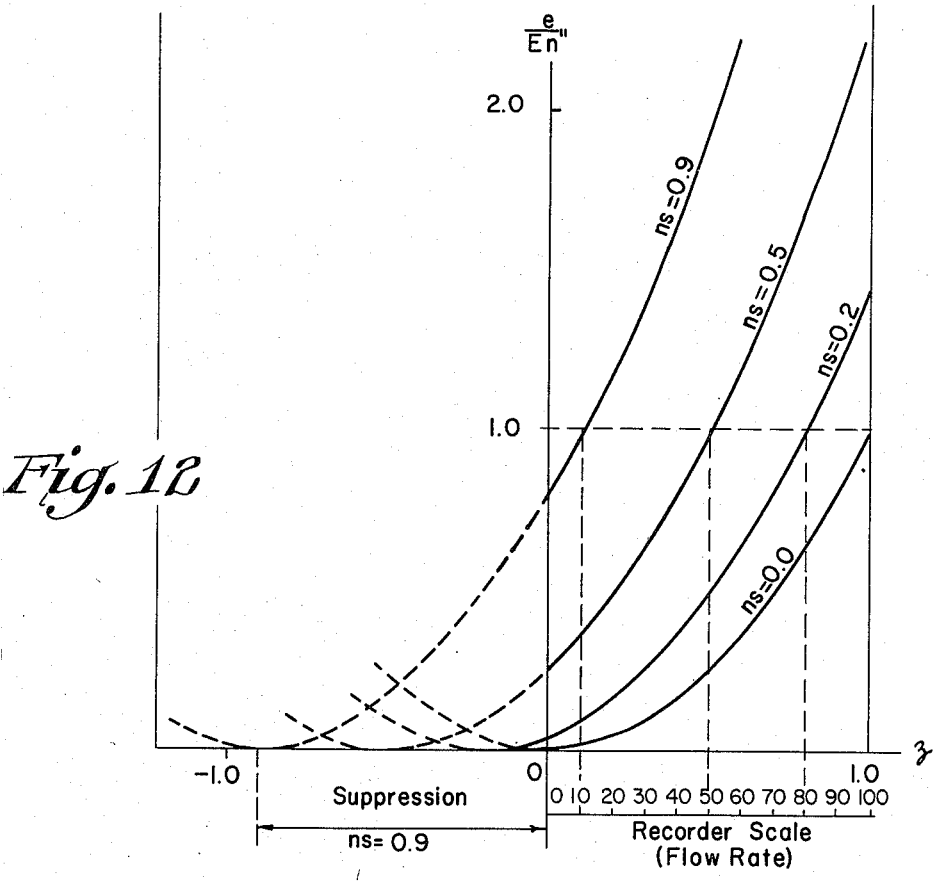
Figure 13:
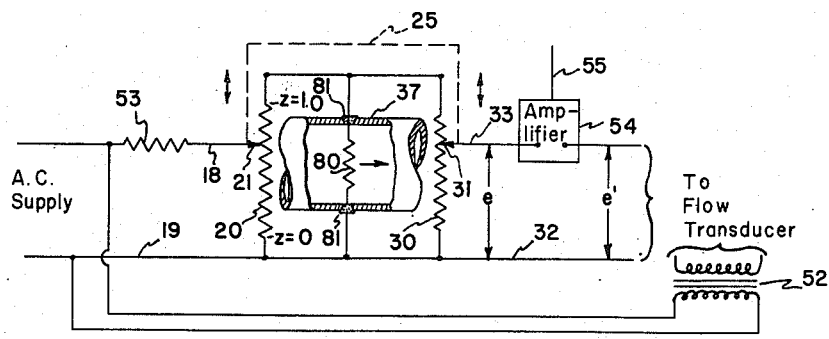
Figure 14:
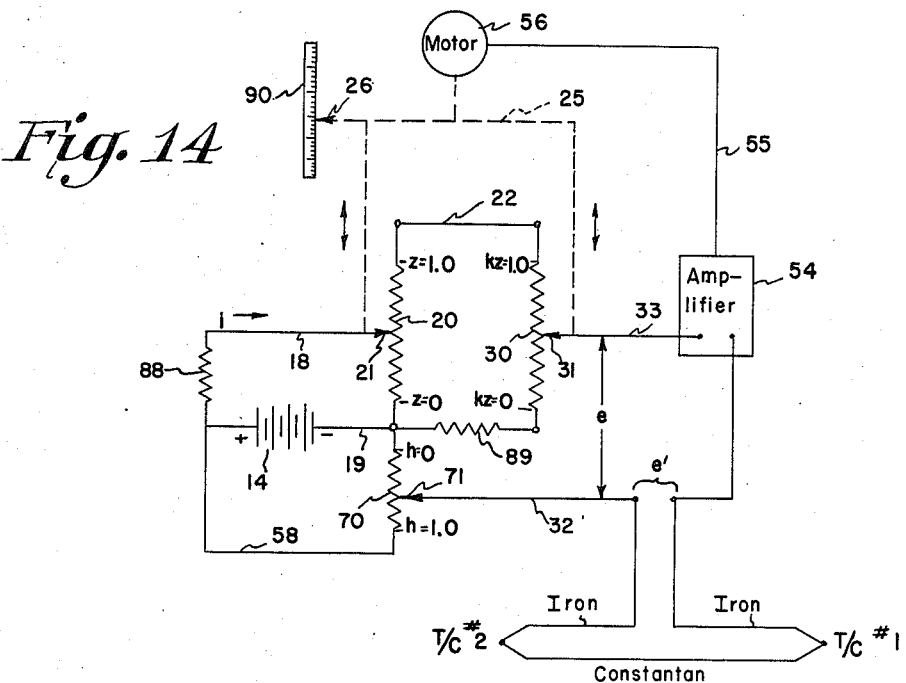
Figure 15:
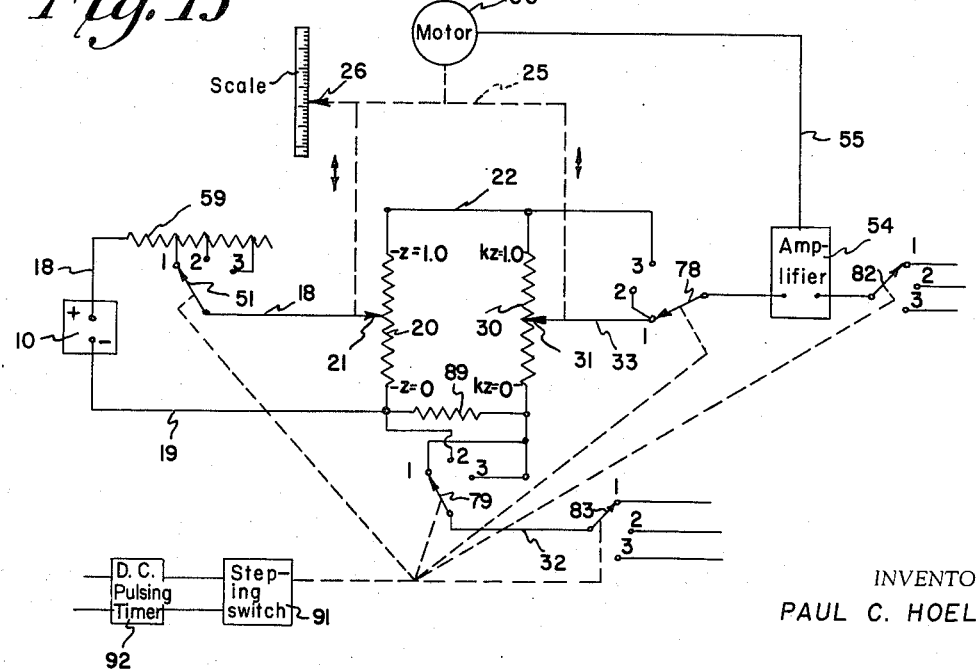
Figure 16:
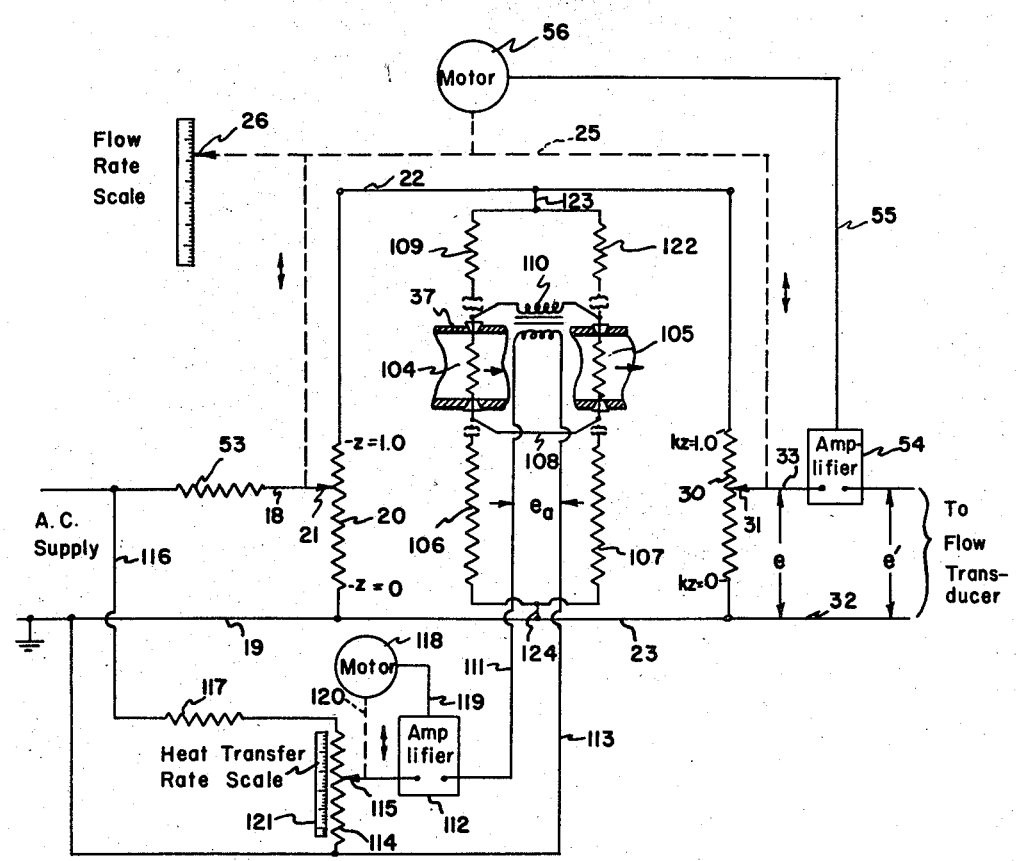

Because the direct-reading scale of the apparatus can be proportioned for any range of measurement in practical units of the phenomenon sensed, the basic function measurable by the apparatus may be described by the equation $e' = a'z^2 + b'z + c'$ where the E. M. F., $e'$, which is the output of the transducer, is expressed in terms of apparatus settings $z$ and coefficients $a'$ and $b'$ and a constant $c'$ characteristic of the apparatus. In the drawings:

Fig. 1 is a diagrammatic representation of the basic circuit of this invention,

Fig. 2 is a diagrammatic representation of a computation circuit according to this invention, which is adapted to measure functions represented by the equation $e' = a'z^2$, Fig. 3 is a diagrammatic representation of a computation circuit according to this invention adapted to measure functions represented by the equation $e' = a'z^2 + b'z$, wherein the coefficients $a'$ and $b'$ have the same sign, Fig. 4 is a diagrammatic representation of a computation circuit according to this invention adapted to measure functions represented by the equation $e' = a'z^2 + c'$, wherein the coefficient $a'$ and constant $c'$ have the same sign, Fig. 5 is a diagrammatic representation of a computation circuit according to this invention adapted to measure functions represented by the equation $e' = a'z^2 + b'z + c'$, wherein the coefficients $a'$ and $b'$ have the same sign and $c'$ may be of the same or opposite sign, Fig. 6 is a diagrammatic representation of a computation circuit according to this invention adapted to measure functions represented by the equation $e' = a'z^2 + b'z$, wherein the coefficients $a'$ and $b'$ are of opposite sign but the value of $b'$ does not lie between zero and $-2a'$, Fig. 7 is a graphical representation of typical functions which are measurable by the apparatus of Figs. 2–6 respectively, Fig. 8 is a diagrammatic representation of one embodiment of flowmeter according to this invention employing an inductance bridge type flow transducer, Fig. 9 is a diagrammatic representation of a modification of the flowmeter of Fig. 8 employing a resistance bridge type flow transducer, Fig. 10 is a diagrammatic representation of a second embodiment of flowmeter according to this invention wherein provision is made for varying the span of measurement, the flow transducer, null-balancing motor and flow rate scale being omitted from the showing, Fig. 11 is a diagrammatic representation of a third embodiment of flowmeter according to this invention wherein provision is made for variable scale-zero suppression, the flow transducer, null-balancing motor and flow rate scale being omitted, Fig. 12 is a graphical representation of the manner in which scale-zero suppression is obtained by use of the apparatus of Fig. 11, Fig. 13 is a diagrammatic representation of a fourth embodiment of flowmeter according to this invention wherein there is provided means compensating for density variations of the fluid measured under changing temperature conditions, the flow transducer, null-balancing motor and flow rate scale being omitted, Fig. 14 is a diagrammatic representation of one embodiment of thermocouple potentiometer according to this invention which is adapted to measure temperature, Fig. 15 is a diagrammatic representation of one embodiment of computing measuring apparatus which is adapted to measure a multiplicity of variables, of which two are of the quadratic function type while one is linear, and Fig. 16 is a diagrammatic representation of one embodiment of heat transfer rate meter incorporating means for the product measurement of fluid flow rate and the temperature difference existing between the inlet and outlet points of a heat exchanger.

Generally, the apparatus of this invention comprises a resistance network including a first and a second linear slidewire, each provided with a tap the adjustable elements of which are ganged by a linear mechanical coupling, a current source powering the resistance network through two junctions, one junction being the tap of the first slidewire, the other junction being at any location in the resistance network other than either of the taps and the second slidewire, an electrical transducer having an E. M. F. output representative of the phenomenon sensed connected in series with a voltage-null detector in electrical opposition to the resistance network at two points, one point being the tap of the second slidewire and the other point being at any location in the resistance network other than either of the taps and the first slidewire. The apparatus may be brought to null balance either manually or automatically by shifting the ganged adjustable elements, whereupon the setting of the taps with reference to a preselected datum base constitutes a linear measure of the phenomenon under evaluation.

Referring to Fig. 1, the computation circuit of this invention may be considered to be the current source 10, leads 18 and 19 connecting the current source to the resistance network, and the resistance network per se comprising movable taps 21 and 31, slidewires 20 and 30 and current paths A and B, which are denoted "conductive means" in the claims and which may each comprise one or more conductors or resistors, or a combination of conductors or resistors with or without an independent current source all as will become clear from the following description. Leads 32 and 33 are the leads connecting transducer 12 in electrical opposition with the computation circuit and the null detector 11 is shown in series connection with lead 33, although it may be connected with lead 32 instead. Also, leads 19 and 32 are shown as connected with conductive means B, although the connection is equally well made to conductive means A, or, for that matter, at any points in the slidewires themselves excepting taps 21 and 31. The linear mechanical coupling ganging taps 21 and 31 is denoted in broken line representation at 25. A pointer 26 integral with coupling 25 is provided as an aid in determining the settings of taps 21 and 31 by reference to a fixed scale 27 mounted adjacent thereto.

A D. C. source 10 is shown for purposes of explanation in Fig. 1, although an A. C. source, for example, 115 v. 60 c., in series with a suitable current-limiting element, is sometimes preferred, because it is thereby more convenient to obtain power for a multiplicity of circuit components from a common source and variations in voltage of the source are then proportionate in the supply of the several components. The essential requirement for the current source, regardless of whether it is D. C. or A. C., is that it supply current substantially independent of variations in the resistance of the network and any associated subsidiary network. In a typical case, and specifically for the computation circuits of Figs. 1–6 inclusive, source 10 may be a 6 volt "A" battery connected in series with a resistor, which is considered integral with 10 and is therefore not shown as a separate element, the aggregate resistance of 10 being of the order of 2000 ohms magnitude when employed in conjunction with slidewires 20 and 30 of 20 ohms individual magnitude, under which circumstances the measured error in the coefficient $a$ of a typical quadratic expression $y = ax^2$ evaluated by the circuit of Fig. 2 proved to be less than $\pm 0.25\%$ referred to the median value of $a$. In general, for accuracy of the order recited the ratio of the resistance of source 10 to the variation in the effective resistance of the resistance network arrangement shown should be 200:1 more or less, a greater ratio yielding even greater accuracy.

The linear slidewires 20 and 30 hereinabove described are examples of a variety of devices, all equally suited to use in this invention, which are sometimes known as "linear potentiometers." These devices may constitute resistors ranged in a straight line, a circle, or a helix and may be operable by moving a contact or by moving the resistor per se relative to a stationary contact; however, either type of operation is comprehended by this invention even though, in the interests of simplicity of representation, slidewires having movable taps are shown in all of the drawings. Also, it will be understood that it is possible to employ different types of slidewires in conjunction, such as a straight-line slidewire in circuit with a helical or circular slidewire, if conditions of use render such an arrangement desirable. Moreover, it is not necessary that slidewires 20 and 30 have equal end-to-end resistances.

It might be mentioned that flexibility is afforded the designer in the choice of a preselected value of the coefficients $a'$ and $b'$ and constant $c'$, which can be achieved by adjustment of the supply current $i$ or by adjustment of the effective end-to-end resistances of the slidewires 20 and 30 or of the resistors accounting for individual terms by the interposition of shunt resistors of suitable value thereacross.

With the polarity as designated in Fig. 1 (and in Figs. 2–6), the flow of current $i$ will, according to common convention, be in the direction designated by the arrows adjacent leads 18 and 19. For convenience in explaining the operation of the powered network for each of the several computation circuits hereinafter described the displacement of tap 21 along slidewire 20 is designated $z$, the lower limit of tap setting then being $z = 0$ while the upper limit is $z = 1$. In this description the factor $k$ is the ratio of the movement of tap 31 to tap 21 relative to their associated slidewires. It will be understood that this ratio is not limited to 1.0 and that various drive mechanisms are commercially available which enable the user to satisfy any particular preselected relationship. Thus to distinguish the movement of tap 31 from that of tap 21, the displacement of 31 along slidewire 30 is designated $kz$, whereupon the corresponding limits of tap setting are $kz = 0$ and $kz = 1$.

As will become apparent from a consideration of the specific circuits hereinafter described, particularly those shown in Figs. 2–6 inclusive, the output E. M. F. of the computation circuit of this invention is a quadratic function of the setting of the two taps, permitting the solution of various forms of quadratic equations depending on the nature of the conductive means A and B, the relative direction of movement of the taps, and the location in the resistance network of the current supply junction and point of transducer connection which are not made to the taps. In the subsequent drawings the same reference numerals are used throughout to designate the same components in all of the several embodiments of this invention.

Referring to Fig. 2, the computation circuit therein shown is adapted to the measurement of functions represented by $e' = a'z^2$ of which curve C, Fig. 7, constitutes a plot. In this computation circuit conductive means A and B constitute conductors 22 and 23, respectively, having a negligible resistance. It will be apparent from Fig. 2 that the current $i$ entering the network through tap 21 divides, so that a portion $i_1$ passes through conductor 22 to slidewire 30, whereupon by application of Kirchoff's laws the following relationships exist:

$$i_1 = \frac{ir_{20}z}{r_{20}+r_{30}}$$

$$e = i_1 r_{30} kz = \frac{ir_{20}r_{30}k}{r_{20}+r_{30}} z^2 = a'z^2$$

where $r_{20}$ and $r_{30}$ are the end-to-end resistances of slidewires 20 and 30 respectively, $z$ is the fractional displacement of tap 21 along slidewire 20 from the lower end ($z=0$) to the upper end ($z=1$), $k$ is the ratio of the movement of tap 31 to tap 21 relative to their associated slidewires, $e$ is the output E. M. F. across leads 32 and 33, and $a'$ is a constant.

From the foregoing, it will be apparent that if $e$ is opposed through a voltage null detector by an E. M. F. $e'$, which latter is the electrical output of a linear transducer representative of a phenomenon and which varies as the particular quadratic function $ax^2$ of the phenomenon, then at null balance $z$ will constitute a linear measure of the phenomenon, which may be conveniently gaged by the position of pointer 26 integral with gang connection 25 with respect to a suitably calibrated evenly divided scale 27. It will be understood from Kirchoff's laws that the potential drop across slidewire 20 is proportional to $z$, whereupon a measurement of this potential drop at balanced setting of taps 21 and 31 by a conventional linear scale voltmeter, such as a self-balancing potentiometer, having leads connected to the extremities of slidewire 20 yields a separate linear indication of the phenomenon. The voltmeter or potentiometer thus constitutes a means for indication at a point physically remote from the measuring apparatus. The same purpose is served by the interposition of a milliammeter in conductor 22 between the slidewires, with the understanding that the inherent resistance of the meter, $r_m$, then becomes a term in the calculation of circuit constants pursuant to the expression $$i_1 = \frac{ir_{20}z}{r_{20}+r_{30}+r_m}$$

Remote indication may be similarly obtained with the other computation circuits hereinafter described, wherefore no further mention is made of this advantageous feature of the invention, except as regards Fig. 11 where a special advantage is obtainable therefrom.

The computation circuit of Fig. 3 is adapted to measure functions represented by $e'=a'z^2+b'z$, where the coefficients $a'$ and $b'$ have the same sign, of which curve D of Fig. 7, where $b'=a'/2$, is a typical plot. It will be noted that in the circuit of Fig. 3 conductive means A constitutes conductor 22 of negligible resistance, but that conductive means B now consists of conductor 23 in series with resistor 28, which accounts for coefficient $b'$. Also, lead 32 now connects to resistor 28 at a point calculated to interpose a predetermined proportion of the resistance of 28 accounting for $b'$ between the points of connection of leads 32 and 33 across which $e$ exists. Resistor 28 is represented as a variable resistor in Fig. 3, in which case a change in the fractional displacement $g$ of tap 29 between the limits 1.0 and zero indicated makes possible the selection of any value of $b'$, independent of the predetermined value of $a'$, once $a'$ is established, between a finite value dependent on the end-to-end resistance of 28 and zero, respectively. If conditions of use do not require changing $b'$, it will be understood that resistor 28 may be a fixed resistor whereupon lead 32 is connected to the network past resistor 28 in the direction of flow of $i_1$.

Again, by the application of Kirchoff's laws, it will be apparent that:

$$a' = \frac{ir_{20}r_{30}k}{(r_{20}+r_{30}+r_{28})}$$

while $$b' = \frac{gr_{28}}{r_{30}k}a'$$

The computation circuit of Fig. 4 is adapted to measure functions represented by $e'=a'z^2+c'$, where the coefficient $a'$ and constant $c'$ have the same sign, of which curve E of Fig. 7, where $c'=0.4a'$, is a typical plot. In the circuit of Fig. 4 conductive means A again constitutes conductor 22 of negligible resistance, but conductive means B now consists of conductor 23 of negligible resistance and resistor 65, which accounts for constant $c'$. Also, lead 32 now connects to resistor 65 at a point calculated to interpose a predetermined proportion of the resistance of 65 accounting for $c'$ between the points of connection of leads 32 and 33 across which $e$ exists. Where resistor 65 is variable as shown, a change in the fractional displacement $j$ of tap 66, to which lead 32 is connected, between the limits 1.0 and zero indicated, permits the selection of any value of $c'$, independent of $a'$, once $a'$ is established, ranging from an upper value dependent on the end-to-end resistance of 65 to zero, respectively. As hereinabove described for the constant $b'$ of Fig. 3, if $c'$ is invariant 65 may be a fixed resistor, in which case lead 32 is connected to the network past resistor 65 in the direction of flow of $i$.

For the circuit of Fig. 4, Kirchoff's laws provide the following values for the coefficient and constant, respectively:

$$a' = \frac{ir_{20}r_{30}k}{(r_{20}+r_{30})}$$

and $$c' = ijr_{65}$$

The computation circuit of Fig. 5 is adapted to measure functions represented by $e'=a'z^2+b'z+c'$, where $a'$ and $c'$ may be of the same or opposite sign ($b'$ remaining of the same sign as $a'$), of which curve F of Fig. 7, where $b'=a'$ and $c'=-a'/2$, is a typical plot. In the circuit of Fig. 5 conductive means A still constitutes conductor 22 of negligible resistance, but conductive means B now consists of conductor 23, resistor 28, and the additional network comprising resistor 70, to which lead 32 connects through tap 71, independent current source 13 and the circuit completion conductors 15 and 17. The independent current source 13 is necessary because $c'$ is of opposite sign from $a'$, the only requirement for source 13 being that any changes in its current output $i_2$ vary in direct proportion to $i$, the output of source 10.

In this circuit individual variable resistors account for coefficient $b'$ and constant $c'$ thus permitting selection of any value of either independent of the other, and also independent of $a'$ once a predetermined value of $a'$ is established. Resistor 70 and its associated tap 71 account for coefficient $c'$ in the same manner as described for resistor 65 and tap 66 of Fig. 4, the limits of setting in Fig. 5 being designated $h=0$ and $h=1.0$, respectively. As previously described for the modification of Fig. 3, if coefficient $b'$ is invariant a fixed resistor 28 is employed, in which case lead 15 is connected to the same part of the network as lead 19, whereupon one or the other can be eliminated and a common lead utilized for completion of the circuit from the negative terminals of the current sources. It follows, of course, that if $c'$ is invariant, a fixed resistor 70 is employed instead of the variable type, the connection of lead 32 being then made directly to lead 17.

It will be understood that $i_2$ is negative (as is also $c'$) when current flows in the direction of the arrow adjacent lead 17 at the same time that current $i$ flows into the network as indicated by the arrow adjacent lead 18, whereas if the reverse is the case the circuit functions in exactly the same manner as the circuit of Fig. 4 as regards $c'$. The values of the coefficients and constant for the circuit of Fig. 5 have been determined to be:

$$a' = \frac{ir_{20}r_{30}k}{(r_{20}+r_{30}+r_{28})}$$

$$b' = \frac{gr_{28}}{r_{30}k}a'$$

$$c' = i_2 h r_{70}$$

In the computation circuits of Figs. 2–5 inclusive, the movement of taps 21 and 31 is always together in the same direction, as indicated by the arrows adjacent the connections of the taps with coupling 25. In the computation circuit of Fig. 6, however, the movement of the taps is in opposite directions, but still linear, as indicated by the pairs of arrows adjacent the mechanical connections, the arrows of the inside and outside pairs being directed in opposite directions.

The computation circuit of Fig. 6 is adapted to measure functions represented by $e' = a'z^2 + b'z$, where the coefficients $a'$ and $b'$ are of opposite sign but the value of $b'$ does not lie within the range defined by the limits of zero and $-2a'$, of which curve G of Fig. 7, where $b' = -2a'$, is a typical plot. In Fig. 6 conductive means A remains conductor 22 of negligible resistance, while conductive means B now consists of conductor 23 in series with fixed resistor 34 and variable resistor 35, to which lead 32 connects through tap 36. The opposite movement of taps 21 and 31 is a convenient way of effecting the algebraic addition of a coefficient $b'$ which is always opposite in sign to that of coefficient $a'$; however, if movement of the taps in a common direction is desired, the same result may be achieved by reversing the connections of conductive means A and B with the ends of slidewire 30. Fixed resistor 34 is proportioned so that, regardless of the setting of tap 36, the value of $b'$ never falls within the prohibited range zero and $-2a'$, which effectively prevents a change of sign of the derivative $de'/dz$ within the range of operation of the apparatus, thereby preserving directional stability in any rebalancing auxiliaries utilized in conjunction with the apparatus. This stability is insured over the non-excluded range by proportioning resistor 34 so that its resistance is always equal to or greater than the product $r_{30}(2k-1)$, the values of the terms of which are defined in the description relating to Fig. 2. As stated for the modification of Fig. 3, if variability of the coefficient $b'$ is not required a fixed resistor may be substituted for the variable resistor 35 shown in Fig. 6, in which case lead 32 is connected to the network past resistor 35 in the direction of flow of $i_1$.

Utilizing the symbols $L=0$ and $L=1$ for the respective limits of setting of tap 36 with respect to resistor 35, by Kirchoff's laws the coefficients of the circuit of Fig. 6 calculate to be:

$$a' = \frac{-ir_{20}r_{30}k}{(r_{20}+r_{30}+r_{34}+r_{35})}$$

and $$b' = -\left(\frac{r_{30}+r_{34}+Lr_{35}}{r_{30}k}\right)a'$$

It will be apparent from the foregoing that a number of different modifications of the basic computation circuit can be devised and that those of Figs. 2–6 inclusive, while representative of types which are considered the most important to an understanding of this invention, are nowise exclusive. For simplicity of explanation the changes in circuitry necessary to account for coefficient $b'$ and constant $c'$ have all been described as being made to conductive means B, but it will be particularly understood that some or all of these changes can just as readily be made to conductive means A and that no limitations of this invention are to be implied by virtue of the consistency adhered to in this respect. Also, the junction of 19 and the connection of 32 with the network can be made to conductive means A instead of B without affecting operation, it being understood that the resulting change in polarity must then be taken into account as will be understood by persons skilled in the art.

In summary, it may be stated that this invention is applicable to the measurement of any phenomena which can be represented by the general equation $$y = ax^2 + bx + c$$

where the phenomenon can be sensed by an electrical transducer having a signal output E. M. F. $e'$ equal to $y$ and where $dy/dx$ does not change sign with any variation of $x$ throughout full scale operation of the apparatus.

Selection of a suitable computing circuit and the determination of the applicable circuit constants $a'$, $b'$ and $c'$ to accommodate any given scale range over which measurement is desired is readily accomplished by use of the following mathematical transformation. If $x$ represents the measured phenomenon value expressed in practical units, then $x_F$ = the full scale value of $x$ (at $z=1.0$), and
$x_0$ = the minimum scale value of $x$ (at $z=0$), whereupon
$x = (x_F - x_0)z + x_0$.

Substituting the value of $x$ expressed in terms of $x_F$ and $x_0$, the general quadratic equation becomes:

$$y = a[(x_F-x_0)z+x_0]^2 + b[(x_F-x_0)z+x_0] + c$$

which, upon expansion of the terms, simplifies to the conventional form $e' = a'z^2 + b'z + c'$, wherein $a' = a(x_F - x_0)^2$,
$b' = (2ax_0 + b)(x_F - x_0)$,
$c' = ax_0^2 + bx_0 + c$, and
$e' = y$ In the measurement of fluid flow it is convenient to evaluate the phenomenon by sensing the pressure drop incurred in the passage of the fluid past a restriction such as an orifice or venturi interposed in the fluid line, when the pressure drop, $\Delta P$, is equal to the product of a constant times $Q^2$ (assuming the density of the fluid remains constant), where $Q$=flow in volumetric units per unit time. In this case the sensed condition is the pressure differential, $\Delta P$, which must first be converted to an E. M. F., $e'$, by a suitable transducer in order to permit its comparison with the output E. M. F., $e$, of the slidewire network. A number of transducers are available commercially for the purpose, of which the inductance bridge of Fig. 8 and the resistance bridge of Fig. 9 are merely representative.

Referring to Fig. 8, the line carrying the flowing fluid is indicated at 37, which is provided with orifice 38 and taps 39 and 40 which afford fluid communication with opposite sides of the diaphragm differential pressure-sensing apparatus indicated generally at 41. The spring-opposed diaphragm of 41 is linked to a magnetic core 42 which, in its movement responsive to changes in the pressure differential across orifice 38, varies the inductances of the two coils 43 and 44, which is reflected in a change in the E. M. F. $e'$ existing across leads 45 and 32. Variable resistors 47 and 48, fixed resistor 46, and capacitor 49 constitute phase-adjusting elements, and the entire transducer assembly as a unit, exclusive of orifice 38, fixed resistor 46, and capacitor 49, is available commercially, one design being the Minneapolis-Honeywell, Brown Instrument Division Part No. 356,944. A typical value of resistor 46 using the identified design of transducer is 280 ohms, while capacitor 49 is 2.0 mf. The inductance bridge is A. C. powered from transformer 52, the secondary winding of which is center-tapped by conductor 50. The primary supply lines of transformer 52 are tapped by lead 18, having in series therewith a current-limiting resistor 53, and lead 19 to provide power for the slidewire network. The apparatus is automatically null-balanced by opposing the E. M. F.'s $e$ and $e'$ through a null detector comprising commercially available phase-discriminating servo-amplifier 54 which powers servo-motor 56 through lead 55, thereby shifting gang connection 25 and taps 21 and 31 up or down slidewires 20 and 30 a compensatory amount. Servo-amplifier 54 must be powered from a source having the same frequency as the source for transformer 52, the leads for which are not shown. Flow is indicated directly by the position of pointer 26 with respect to the stationary flow rate scale which must, of course, first be calibrated in the proper units in which measurement is desired. It will be understood that auxiliary equipment known to the art may be coupled to mechanical connection 25 for the purpose of performing a control function, such as operating a servo-controlled throttling valve or the like mounted in line 37.

The apparatus of this invention can be made manually operable by merely substituting a conventional visual type of null detector in the series circuit comprising the output leads of the transducer and the slidewire network, e. g., a voltmeter in the circuit between tap 31 and the transducer in place of servo-amplifier 54 and eliminating lead 55 and servo-motor 56.

The flowmeter of Fig. 9 is similar to that of Fig. 8, except that a resistance bridge is substituted for the inductance bridge, a suitable design being the strain gage transducer marketed by Statham Laboratories. This type of bridge functions by continuous adjustment of adjacent pairs of the resistors 60, 61, 62 and 63 a like amount, but in opposite sense, through movement of the common mechanical connection 64 which is fixedly attached to the diaphragm of differential pressure-sensing apparatus 41. It frequently happens that transducers do not have exact zero output at zero fluid flow, wherefore it is necessary to provide appropriate compensation and this can be conveniently accomplished in the manner described for the inclusion of a $c'$ constant as shown in Fig. 4. The same reference numerals are therefore employed in Fig. 9 to designate the zeroing control comprising variable resistor 65 and tap 66 to which lead 32 is connected. It will be understood, of course, that the same type of zeroing control may be utilized with the apparatus of Fig. 8 if conditions require.

The circuit of Fig. 10 illustrates one simple way of obtaining variable span of measurement in the flowmeter hereinabove described. In this embodiment the slide-wire network is powered through a variable resistor 68 which permits variation at will of the current input between predetermined limits. Adjustment of span is facilitated by calibrating the tap 67 of resistor 68 to indicate the range which is obtained for each particular setting, it being understood that the scale of reference for the variable resistor setting is non-linear for the reason that the network E. M. F. varies as a quadratic function of the measuring scale span, under which conditions it is necessary, for example, to reduce the supply current by a factor of four in order to halve the range of flow measurement. This is not disadvantageous, because the resistor setting does not affect the linearity of the flow rate scale.

In Fig. 10, resistor 69 constitutes a current-limiting resistance. If desired, variation in the span of measurement may be obtained solely by varying the resistance interposed to slidewire network current supply, as by utilizing a variable resistor 69 instead of a fixed resistor, in which case variable resistor 68 may be dispensed with.

If this type of span adjustment is utilized generally satisfactory accuracy is obtained by preserving the lower limit of resistance at a ratio no less than about 200:1 as compared to the effective variation in resistance of the resistance network for the reasons hereinbefore stated in the description relating to Fig. 1, under which circumstances an enhanced accuracy will obtain at higher ratios.

A highly advantageous feature of the apparatus of Fig. 11 is variable scale-zero suppression. Here the objective is to provide means for suppressing the zero to the extent that measurement may be initiated at any preselected value of the measured phenomenon, whereupon the original designed scale span is utilized for making an evaluation within any desired increment of range corresponding to the design scale span. Under these conditions the instrument has the same scale sensitivity for a given increment of flow change at high flow rates as it does at low flow rates.

The manner in which variable scale-zero suppression is achieved in a flowmeter will be apparent from consideration of Fig. 11 in conjunction with Fig. 12. Referring to Fig. 11, the resistance network of the basic circuit of Fig. 1 is modified by making conductive means B a slide-wire network, the added network comprising linear slide-wires 72 and 73, joined at the lower end by conductor 74, which are provided with taps 75 and 76, respectively. A gang connection 77, similar in all respects to gang connection 25, is provided for the added network, and power circuit completion lead 19 is connected to the complete network through tap 75, while the E. M. F. comparison lead 32 is connected through tap 76. Purely by way of example, and not limitation, an A. C. power source is shown for the network which constitutes transformer 78, the primary leads of which are tapped by leads 79 and 80 for powering the primary of transducer transformer 52. Current-limiting resistors 81 and 82 are interposed between the secondary of transformer 78 and leads 18 and 19, respectively.

As in the case of the basic circuit of Fig. 1 it is desirable to impose a resistance of sufficient magnitude in the power supply to the network so that there is preserved a substantially constant ratio between $i$, the supply current, and E, the supply voltage, for all settings $z$ of slidewires 20 and 30 and all settings $s$ of slidewires 72 and 73. This resistance is provided by resistors 81 and 82, the division of the resistance load into two parts being advantageous from the practical standpoint in that it is possible by proper proportioning of one with respect to the other to compensate for capacitance differences to ground from the two ends of the secondary of transformer 78. If transformer capacitance difference is not appreciable a single resistor may be substituted in either of the leads 18 and 19 for the two resistors 81 and 82 shown.

It is necessary to the operation of the circuit of Fig. 11 that the following relationship be preserved as regards the end-to-end resistances, $r$, of the several slidewires of the network, wherein the subscript numbers identify each:

$$r_{72}/r_{20}=r_{73}/r_{30}=n, \text{ a constant}$$

If this proportioning is observed, then $r_{72}=nr_{20}$ and $r_{73}=nr_{30}$, whereupon, if $i=E/n'$, where $n'$ is a constant, as hereinabove postulated, the resistance network output voltage $e=i_1 (r_{30}z+nr_{30}s)$.

But, by the application of Kirchoff's laws, since $$i_1=\frac{E}{n'} \cdot \frac{r_{20}z+nr_{20}s}{r_{20}+nr_{20}+r_{30}+nr_{30}}$$

$$e=\frac{E}{n'} \cdot \frac{r_{20}r_{30}(z+ns)^2}{(r_{20}+r_{30})(n+1)}$$

and the quantity $$\frac{r_{20}r_{30}}{(r_{20}+r_{30})(n+1)n'}=n''$$

a circuit constant.

The simplified relationship may then be written as $e=En''(z+ns)^2$, from which it is apparent that the output voltage of the network is again a quadratic function of tap displacement, although in this case the mode of the basic circuit is extended to cover the movement of two sets of taps as distinguished from that of a single set. The second variable in the expression, namely $ns$, permits lateral shifting of the plot representative of the basic circuit function at the will of the operator while at the same time rigidly constraining the shift to the abscissa axis as depicted in Fig. 12.

The range of zero suppression illustrated by the curves shown in Fig. 12 is merely representative of the control attainable with the apparatus of Fig. 11, it being understood that suppressions of several-fold are frequently desirable in practice and may readily be obtained with the embodiment described. The showing of Fig. 12 is limited to the 0–0.9 range solely because of convenience in representation, the family of curves increasing in slope and progressive displacement from the origin along the ordinate axis so rapidly at values of $ns$ above unity that considerations of space and compactness in plotting make the lower range preferred from the standpoint of a patent disclosure. A typical flow rate scale has been drawn in parallel to the abscissa, i. e., the tap 21—31 displacement axis, to illustrate that the full scale range of 0–100 may be used where there is no zero suppression to evaluate flows varying from 0 to 100 flow units, while the curve for 0.2 suppression referred to the same scale covers a range from 20 to 120 units, the curve for 0.5 suppression the range from 50 to 150 units, and the curve for 0.9 suppression the range from 90 to 190 units. In practice it is desirable to eliminate the possibility of human error in obtaining predetermined zero suppressions by the precise settings which are required with the slidewire pair 72—73 of Fig. 11. This can be accomplished by substituting a number of pairs of resistors of proportioned magnitude in series relationship for the slidewires 72 and 73, each pair being sized to achieve the desired degree of zero suppression, and providing a double-pole multi-throw switch to introduce any desired proportional resistance between the slidewires 20 and 30 and the current source and transducer, respectively.

Where remote indication is desired with provision for zero suppression as shown in Fig. 11, a meter 92, e. g., a high resistance voltmeter, is simply connected between the two slidewires and their associated zero suppressing resistors. Meter 92 constitutes a non-suppressed scale for the phenomenon measured, as distinguished from the zero suppressed scale for gaging tap displacement (not shown) adjacent coupling 25 representative of the phenomenon measured. Thus, remote indication in this case is of particular advantage in that it is thereby possible to obtain two scales of measurement, which is often desirable as a practical matter.

In the circuit of Fig. 11 the ratio of the movement of tap 31 to tap 21 relative to their associated slidewires, or the factor $k$ hereinbefore defined, is unity; however, zero suppression can of course be obtained with any other values of $k$, provided that the ratio of the resistance measured from tap 75 to the $s=0$ end of slidewire 72 in the direction of descending scale of $s$ for slidewire 72 to the end-to-end resistance of slidewire 20 is equal to the ratio of the resistance measured from tap 76 to the $s=0$ end of slidewire 73 in the direction of descending scale of $s$ for slidewire 73 to the product of the end-to-end resistance of slidewire 30 and $k$. This same ratio must be preserved as regards the resistances introduced in each slidewire arm of the resistance network by the switch where the switching version of zero suppression is employed. In the claims the fraction of the zero suppressor resistance corresponding to that introduced by tap 75 in its setting on slidewire 72 measured in the direction of descending scale of $s$ for slidewire 72 is denoted the "second junction-selected fraction" of the associated resistor, whereas the fraction of the zero suppressor resistance corresponding to that introduced by tap 76 in its setting on slidewire 73 measured in the direction of descending scale of $s$ for slidewire 73 is denoted the "second connection-selected fraction" of the associated resistor. Furthermore, it is necessary that the sum of the end-to-end resistances of the zero suppression resistors remain constant.

In its broadest employment zero suppression according to this invention permits lateral shifting of any of the computed relationships for circuits accounting additionally for coefficient $b'$ and constant $c'$ with complete freedom, except that the shift of the curves is in this case constrained to parallelism with the abscissa axis.

Referring to Fig. 13, there is shown one way in which a flowmeter constructed according to this invention may be made to correct for changes in density with temperature of the flowing fluid under measurement in a fluid having constant density-temperature characteristics. The fluids flowing in pipe lines located out-of-doors or in unheated buildings often display relatively great temperature differences between the summer season on the one hand and the winter season on the other. Temperature differences of appreciable magnitude are accompanied by corresponding differences in fluid density which, in turn, affects the pressure differential existing across the sensing orifice or venturi interposed in the fluid line 37. The effects of such temperature variation may be readily corrected for by mounting a resistance thermometer 80 within line 37, electrically insulated therefrom by plugs 81, and shunted across the resistance network between slidewires 20 and 30. Resistor 53, as in Fig. 8, constitutes a current-limiting resistance and transformer 52 provides power for the flow transducer, which is not shown.

The objective with the circuit of Fig. 13 is to choose a resistance thermometer 80 which displays a variation in resistance with temperature of such magnitude as to vary $e$, the output voltage of the network, in the appropriate amount and direction corresponding to the change occurring in $e'$, the output voltage of the flow transducer, when the transducer operates on fluids at temperatures above or below a chosen datum level, e. g., 20° C. If the flow rate scale (not shown) is then calibrated in terms of flow at the datum temperature it will be apparent that indication, and control, if provided, will be substantially independent of fluid density variations resulting from this cause. The system may then be weight-rate of flow calibrated as distinguished from volume-rate of flow calibrated if desired.

The principle upon which correction for changes in density of the fluid with temperature is based will be clear from the following considerations. If $d$ represents the resistance of thermometer 80, by Kirchoff's laws:

$$e=iz^2\left(\frac{d}{Kd+1}\right)$$

where $e$ is the output E. M. F. across leads 32 and 33

$K$ is a constant equal to $\frac{r_{20}+r_{30}}{r_{20}r_{30}}$ and $z$ is the setting of slidewires 20 and 30.

But, as hereinbefore described for the apparatus of Fig. 8, the measured differential pressure $\Delta P$, developed across the restriction in line 37, and, hence, the output E. M. F. $e'$ of the linear differential pressure transducer, is proportional to the square of the volume rate of fluid flow through line 37. Specifically, $$e'=k''\rho Q^2=k''W^2\left(\frac{1}{\rho}\right)$$

$\rho$ is the density of fluid flowing through line 37
$k''$ is a constant
$W$ is the weight rate of fluid flow through line 37, and
$Q$ is the volume rate of fluid flow through line 37

From the foregoing it will be apparent that, where the relationship of the weight rate of flow W of the fluid to $z$ is to be preserved independent of the ambient temperature, $e'$ will be proportional to $1/\rho$ while $e$ will be proportional to $$\frac{d}{Kd+1}$$

Consequently, if $$\frac{d}{Kd+1}$$

is made proportional to $1/\rho$, any changes in the density of the fluid with temperature reflected in $e'$ will be compensated precisely by a corresponding change in $e$.

In a typical apparatus constructed according to Fig. 13, wherein resistor 53 had a resistance of 30,000 ohms, slidewires 20 and 30 an end-to-end resistance of 100 ohms each and resistance thermometer 80 was of the Leeds & Northrup "Thermohm" type having a nominal resistance of 100 ohms at 20° C., the following satisfactory density-temperature compensation were effected for a flowing stream of light oil over the temperature range set out:

| Resistance of Thermometer 80 | Oil Temp., °F. | Measured Oil Density | Oil Density Computed by Apparatus |
|---|---|---|---|
| 106.34 | 100 | 0.785 | 0.787 |
| 116.64 | 150 | 0.765 | 0.765 |
| 127.64 | 200 | 0.747 | 0.746 |
| 139.39 | 250 | 0.727 | 0.728 |

Turning now to temperature measurement according to this invention, reference is had to Fig. 14 which illustrates temperature indication wherein thermocouples are utilized as the physical condition-sensing means. In this case temperature difference is the quantity which it is desired to evaluate, the embodiment of Fig. 14 relating to the situation where one temperature is fixed and the other may vary independently.

The temperature-E. M. F. equations for may types of thermocouples are substantially quadratic in form over a wide range of operation, and to this extent are similar to those representative of fluid flow; however, the mathematical expression for the determination of thermocouple output voltage, $e'$ in a typical case (e. g., iron-constantan thermocouple in the range 0–1000° F.), is somewhat more complicated and may be written as follows:

$$e' = d'(T_1^2 - T_2^2) + f(T_1 - T_2)$$

where $T_1$ is the temperature of the first thermocouple junction,
$T_2$ is the temperature of the second thermocouple junction, and
$d'$ and $f$ are constants If $T_2$ is maintained constant, as is often the case, the foregoing expression may be written as follows:

$$e' = d'T_1^2 + fT_1 + k_0$$

where $k_0 = -(d'T_2^2 + fT_2)$.

Thus it is apparent that the thermocouple expression resolves itself into the classical form of quadratic equation $y = ax^2 + bx + c$, the constants $d'$, $f$ and $k_0$ in the order recited corresponding to the constants $a$, $b$ and $c$ (or $a'$, $b'$ and $c'$ for the expression $e' = a'z^2 + b'z + c'$), respectively. These constants are accounted for by the interposition of fixed resistors at strategic points in the basic circuit of Fig. 1 in the manner hereinafter described.

Referring to Fig. 14, it is necessary to employ a D. C. power source 14 for apparatus utilizing thermocouples as temperature transducers, since the output of thermocouples is D. C. Power source 14 is represented as a battery, which may be a 6 volt "A" battery; however, it will be understood that A. C., such as 115 v., 60 c., may be used if supply is through the intermediary of a rectifier, e. g., a germanium diode, in which case it is preferred to incorporate a voltage regulator and capacitor on the output side in order to smooth out transmitted A. C. components. Since the sign of the third term of the quadratic equation is negative, the junction of source 14 in this circuit is made direct to the slidewire network via lead 19, while conductive means B constitutes resistor 89 and lead 58 in series with resistor 70 (accounting for $k_0$) connected to the same terminal of source 14 as lead 18 in series with resistor 88. Resistor 88 disposed ahead of tap 21 accounts for the $d'$ coefficient of the thermocouple-E. M. F. equation, whereas resistor 89 accounts for the $f$ coefficient. The same reference numerals are employed for resistor 70 and tap 71, connecting with lead 32, as were employed for the circuit of Fig. 5, since the apparatus of Fig. 14 measures a variable of the general quadratic form for which the apparatus of Fig. 5 is broadly applicable. It will be understood that if an invariant temperature is preserved for thermocouple #2 a fixed resistor 70 of suitable magnitude may be substituted for the variable type shown, in which case lead 32 is connected past resistor 70 in the direction of the positive terminal source 14. Also, it is possible to dispense with resistor 70 entirely if thermocouple #2 is maintained at a fixed temperature such as 32° F., as by immersion of the junction in an ice bath, by calibrating temperature scale 90 accordingly.

It will be noted that thermocouple #1 is connected in electrical opposition with thermocouple #2 through the common metal lead, which in the apparatus shown is constantan alloy, whereupon, if the thermocouple connections with the instrument circuit are maintained at the same temperature, the net output voltage $e'$ opposed to the resistance network output voltage $e$ through servo-amplifier 54 is that due to the difference in temperature between the junctions of the two thermocouples. This temperature difference is linearly related to the position of taps 21 and 31 when the slidewire network is brought to null balance by operation of servo-motor 56 and is indicated by pointer 26 in its movement opposite the linearly calibrated temperature scale 90.

In practice thermocouple #2 might not always be maintained at a fixed temperature such as that of an ice bath and, in this case, satisfactory compensation for changes in its ambient temperature may be achieved by substituting a resistance thermometer for resistor 70 and locating the thermometer in close proximity to the thermocouple junction as in conventional practice. With the temperature scale 90 calibrated for the particular conditions, satisfactory compensation for usual temperature variations of the reference thermocouple is obtained.

Fig. 15 shows schematically one simplified design of apparatus useful for measuring in sequence a multiplicity of variables, in this case three, of which two conform to different types of quadratic equations while the third is linear. Oftentimes it is desirable to measure several different phenomena substantially simultaneously and indicate or record the several values on a common scale. The apparatus of Fig. 15 is particularly adapted to such service in that a single instrument can be utilized for a number of variables within the customary limitations of cycle timing.

The apparatus of Fig. 15 is specifically designed to measure (1) flow, (2) temperature (as sensed by thermocouples) and (3) pressure, the individual connections to and from the individual transducers being indicated in the numerical sequence recited but the transducers themselves not being shown since they are identical with the types hereinabove described wtih reference to Figs. 9 and 14, except that the former is powered from an isolated D. C. source. A D. C. source indicated generally at 10 powers the network through a multi-tapped resistor 59, each switch point of which is disposed so that the necessary resistance is interposed in the circuit for each setting of the switch 51 to account precisely for each of the individual first term coefficients. Resistor 89 is proportioned to account for the second coefficient in the thermocouple-E. M. F. equation. The necessary connections which modify the circuit to conform to the pattern of the equation solved for each variable concerned are made through switch 78, connecting the resistance network through amplifier 54 to the transducers, and switch 79, which establishes the return connection from the transducers to the network. In addition, switches 82 and 83, respectively are provided to connect amplifier 54 to each of the several transducers in turn and establish the return connection to the network in accordance with the positions taken by switches 51, 78 and 79. All of the switches make circuit in unison through the several positions 1, 2, 3 in repeated sequence under the actuation of stepping switch 91, which may be of the telephone type No. 45 marketed by the Automatic Electric Co. Switch 91 is powered by a commercially available D. C. pulsing timer 92.

In operation, with all switches in position 1, the circuit configuration is the same as that shown in Fig. 3 where $b'$ is invariant (solving the equation $e' = a'z^2 + b'z$) except that the return connection is made to the lower end of 30, whereby the $b'$ coefficient is effectively zero, and a measurement of fluid flow is obtainable from the rebalanced position of pointer 26 with reference to the adjacent scale. When the allotted time for this measurement has elapsed, the switches are moved to position 2, whereupon the configuration of the circuit becomes that shown in Fig. 3 where $b'$ is invariant (solving the equation $e' = a'z^2 + b'z$). Finally, in position 3, the switches modify the circuit configuration so that slidewire 30 and resistor 89 following it in the network are effectively by-passed and the value of $e$ opposing $e'$ depends simply on the position of tap 21 with respect to slidewire 20, which at rebalance constitutes a solution of an equation of the form $y = ax$ (or $e' = a'z$), or pressure as sensed by a suitable linear strain gage, for example. Obviously, the circuit described can be modified in numerous ways to accomplish the specific results achieved by the embodiments hereinbefore disclosed and the modifications to each of them which have been alluded to.

The heat transfer rate meter of Fig. 16 constitutes an example of an embodiment of this invention adapted to measure the product of a first physical phenomenon and a second physical phenomenon where the first physical phenomenon is sensed in direct proportionality relationship by a subsidiary circuit which is powered from the first slidewire of the resistance network by a current which is directly proportional to the second phenomenon. A convenient type of subsidiary circuit adapted to this service is a resistance bridge, such as that hereinafter described specifically for the circuit of Fig. 16; however, it will be especially understood that other kinds of subsidiary circuits, e. g., even a single variable resistor responsive to the first physical phenomenon in direct proportionality relationship and powered from the first slidewire, may be utilized. Obviously, the basic requirements for the subsidiary circuit can be met by connection of the subsidiary circuit to the resistance network in a variety of ways, some of which are hereinafter described with reference to the specific embodiment of Fig. 16, and the specific connection utilized for product measurement in any particular case constitutes no limitation of the invention so long as the basic requirements hereinabove specified are satisfied.

The heat transfer rate meter of Fig. 16 performs a fluid flow rate determination, which may or may not be independently indicated (or controlled) whichever is desired, and, in addition, senses the temperature difference existing across the inlet and outlet end of the fluid-carrying path and obtains the product of the latter quantity times the fluid flow rate, whereupon a linear indication (or control) of power is obtained.

The resistance network of the circuit of Fig. 16 comprises the basic circuit of Fig. 1, in the form shown in Figs. 2, 8 and 9, wherefore like components are designated by the same reference numerals wherever this identity is preserved, except that a subsidiary circuit comprising a resistance bridge is added, for sensing temperature difference independently and for measuring the product of temperature difference and fluid flow rate, together with a separate amplifier-servo motor mechanism for giving a signal measurement of this product. The subsidiary circuit consisting of the resistance bridge in Fig. 16 is readily identified in Fig. 16, in that it includes all elements connected to the resistance network by leads 123 and 124. This connection can just as readily be made by connecting the resistance bridge in series relationship with conductor 22, or with one side only in series relationship and the other in parallel relationship with 22, or in other ways, the only limitation being that the bridge power is derived from slidewire 20 by connections which, in Fig. 16, are at the extremities of this slidewire.

Referring to Fig. 16, an A. C. power source is employed which is connected to lead 18 of the slidewire network through a current-limiting resistor 53 having the same function as resistor 53 of Fig. 8. The inlet temperature of the fluid in flow is sensed by resistance thermometer 104 and the outlet temperature by resistance thermometer 105, both of which are elements of the resistance bridge and both of which are disposed in contact with the fluid flowing in line 37.

The resistance bridge paths including the resistance thermometers have the same arrangement, in that each is provided with a resistor 109 or 122 of critically proportioned value with respect to changes in resistance with temperature of resistance thermometers 104 and 105, respectively, and individual resistors 106 and 107, shunted by conductor 108, are provided in compensation for the effect of long leads where it is necessary to locate the measuring apparatus a considerable distance from the flow line under investigation.

Ordinarily, it is preferred to employ resistance thermometers 104 and 105 which are identical to a close approximation, which may be accomplished by careful matching.

For best accuracy in the sense of obtaining substantial independence of the flow meter sub-assembly from variations in resistance thermometer ambient temperature and also of obtaining an output voltage from the slidewire network which varies substantially linearly with the product of flow rate and temperature difference, the resistance of 109 plus the mean value of the resistance of thermometer 104 should be large compared with the variation of 104 from its mean value, and the same relationship should exist for the resistance of 122 with respect to resistance thermometer 105. The requirement for resistors 106 and 107 is that each have a magnitude which is high as compared to the changes in resistance of the leads, it being understood that, if short leads are employed, resistors 106 and 107 and conductor 108 can be dispensed with. In a typical apparatus in which the foregoing proportioning principles were observed, elements having the following resistances gave good performance where at 115 v., 60 c. A. C. source was utilized:

Resistor 53—7000 ohms
Slidewire 20—35 ohms
Slidewire 30—35 ohms
Resistance thermometers 104 and 105 (L. & N. Model No. 8193–3)—nominally 10 ohms each
Resistor 109—100 ohms
Resistor 122—100 ohms Resistors 106 and 107, correcting for effect of long leads—20 ohms each The power signal derived from the resistance bridge subsidiary circuit of Fig. 16 is the E. M. F., $e_a$, induced in the secondary winding of transformer 110, the primary winding of which is connected between resistor 109 and thermometer 104 on the one hand and resistor 122 and thermometer 105 on the other. The power signal is impressed across lead 111, connected to one side of servo-amplifier 112, and lead 113, connected to the lower end of an independent linear slidewire 114 provided with a tap 115. Slidewire 114 is powered by lead 116 having in series therewith current-limiting resistor 117. A servo motor 118, powered through lead 119 by the difference in potential applied across amplifier 112 through tap 115 and lead 111, restores null balance to the system by movement of tap 115 through mechanical connection 120. A linear heat transfer rate scale 121 calibrated in the units of power desired is provided adjacent slidewire 114 for convenient power indication. As shown, the basic computer network is null-balanced in the same way as the embodiments of this invention hereinbefore described by servo-amplifier 54 receiving the opposed signals $e$, derived from the network, and $e'$, derived from the flow transducer (not shown), which powers servo-motor 56 through lead 55, thereby shifting taps 21 and 31 along their associated slidewires through the agency of mechanical coupling 25. If an independent indication of fluid flow rate is desired, coupling 25 may be provided with a pointer 26 operating in conjunction with a linear flow scale in the same manner as has already been described for the apparatus of Figs. 8 and 9.

The operation of the apparatus of Fig. 16 is readily understandable from a consideration of the computation circuit of Fig. 2, which is embodied in the heat transfer rate meter. As previously described for Fig. 2, the current supplied to the right-hand slidewire 30 is linearly related to the position of taps 21 and 31 and thus, at null balance, is linearly representative of the fluid flow rate. This current divides between the two branches comprising the resistance bridge including resistance thermometers 104, 105 and slidewire 30. If the resistance thermometers 104 and 105 are matched and are exposed to the same ambient temperature, no E. M. F. will be induced in the secondary winding of transformer 110 and there will be zero power indication on scale 121. However, if the temperature of thermometer 105 is greater or smaller than that of thermometer 104, a characteristic potential $e_a$ representative of the product of temperature differential and flow rate will be induced in the secondary. The E. M. F. $e_a$ constitutes a measure of power, which is indicated by the position of tap 115 with respect to scale 121.

As in the embodiments hereinbefore described, the apparatus to Fig. 16 can be made to exercise a control function, such as, for example, by the operation of a throttling valve or other regulatory device altering either fluid flow rate or fluid temperatures, by the incorporation of additional conventional servo-mechanism auxiliaries responsive to the null-balancing servo-motors shown.

From the foregoing, it will be apparent that this invention is adapted to wide modification within the skill of the art without deviating from the essential spirit, wherefor it is intended to be limited only by the scope of the following claims.

What is claimed is:

1. An electrical computing measuring apparatus comprising in combination a resistance network consisting of first and second linear slidewires each provided with a tap, the physically adjustable elements of said slidewires being ganged by a linear mechanical coupling, first conductive means connected between one end of said first slidewire and one end of said second slidewire, and second conductive means connected between the other ends of said slidewires, a current source connected to said resistance network through two junctions, one junction being the tap of said first slidewire the other junction being any location in said resistance network other than the slidewire taps and said second slidewire, the current supplied by said source being substantially independent in magnitude for all variations of resistance of said resistance network, and a transducer connected in series with a voltage-null detector in electrical opposition to said resistance network at two points, one point being the tap of said second slidewire, the other point being any location in said resistance network other than the slidewire taps and said first slidewire, said transducer developing an output E. M. F. as a quadratic function of a phenomenon under determination.

2. An electrical computing measuring apparatus according to claim 1 wherein the derivative of the output E. M. F. of the transducer with respect to the position of said linear mechanical coupling with reference to a datum position remains unchanged in sign over the range of operation having a null-detector comprising a servo-amplifier and a servo-mechanism responsive to said servo-amplifier connected in driving relationship to said linear mechanical coupling for shifting said physically adjustable elements of said slidewires upon the existence of E. M. F. imbalance between said resistance network and said transducer in a direction restoring null balance therebetween.

3. An electrical computing measuring apparatus with provision for variable scale zero suppression comprising in combination a resistance network consisting of first and second linear slidewires each provided with a tap, the physically adjustable elements of said slidewides being ganged by a linear mechanical coupling, first conductive means connected between the first end of said first slidewire and the first end of said second slidewire, and second conductive means consisting of a first resistor and a second resistor, the first end of said first resistor being connected with the first end of said second resistor while the second end of said first resistor is connected with the second end of said first slidewire and the second end of said second resistor is connected with the second end of said second slidewire, the sum of the end-to-end resistances of said first and second resistors being constant, a current source connected to said resistance network through first and second junctions, said first junction being the tap of said first slidewire and said second junction being a location on said first resistor, the current supplied by said source being substantially independent in magnitude for all variations of resistance of said resistance network, and a transducer connected in series with a voltage null-detector in electrical opposition to said resistance network by first and second connections, said first connection being the tap of said second slidewire and said second connection being a location on said second resistor, said transducer developing an output E. M. F. as a quadratic function of a phenomenon under determination, the location of said second junction on said first resistor and the location of said second connection on said second resistor being preselected so that the ratio of the second junction-selected fraction of the resistance of said first resistor to the end-to-end resistance of said first slidewire is equal to the ratio of the second connection-selected fraction of the resistance of said second resistor to the product of the end-to-end resistance of said second slidewire and the ratio of the movement of said second tap relative to said second slidewire to the movement of said first tap relative to said first slidewire.

4. An electrical computing measuring apparatus with provision for remote indication comprising in combination a resistance network consisting of first and second linear slidewires each provided with a tap, the physically adjustable elements of said slidewires being ganged by a linear mechanical coupling, first conductive means connected between one end of said first slidewire and one end of said second slidewire, and second conductive means connected between the other ends of said slidewires, a current source connected to said resistance network through first and second junctions, a linearly responding meter of the class comprising current measuring meters and voltage measuring meters connected to said resistance network beyond the extremities of said first slidewire, the current supplied by said source being substantially independent in magnitude for all variations of resistance of said resistance network and said meter, said first junction of said current source being the tap of said first slidewire, said second junction of said current source being any location in said resistance network other than said slidewire taps and said second slidewire, and a transducer connected in series with a voltage-null detector in electrical opposition to said resistance network at two points, one of said points being the tap of said second slidewire, the other of said points being any location in the resistance network other than said slidewire taps and said first slidewire, said transducer developing an E. M. F. as a quadratic function of the phenomenon under determination.

5. An electrical computing measuring apparatus with provision for varying the scale span comprising in combination a resistance network consisting of first and second linear slidewires each provided with a tap, the physically adjustable elements of said slidewires being ganged by a linear mechanical coupling, first conductive means connected between one end of said first slidewire and one end of second slidewire, and a second conductive means connected between the other ends of said slidewires, a current source provided with means for varying the current output thereof connected to said resistance network through two junctions, one junction being the tap of said first slidewire, the other junction being any location other than the slidewire taps and said second slidewire, the current supplied by said source being substantially independent in magnitude for all variations of resistance of said resistance network over the full range of variation of said current, and a transducer connected in series with a voltage-null detector in electrical opposition to said resistance network at two points, one point being the tap of said second slidewire, the other point being any location in the resistance network other than the slidewire taps and said first slidewire, said transducer developing an output E. M. F. as a quadratic function of a phenomenon under determination.

6. An electrical computing measuring apparatus adapted to measure the product of a first phenomenon and a second phenomenon comprising in combination a resistance network consisting of first and second linear slidewires each provided with a tap, the physically adjustable elements of said slidewires being ganged by a linear mechanical coupling, first conductive means connected between one end of said first slidewire and one end of said second slidewire, and second conductive means connected between the other ends of said slidewires, a current source connected to said resistance network through first and second junctions, a subsidiary circuit adapted to sense a first physical phenomenon by a direct proportionality relationship powered from said resistance network in direct proportion to said second phenomenon by connections to said resistance network beyond the extremities of said first slidewire, the current supplied by said source being substantially independent in magnitude for all variations of resistance of said resistance network and said subsidiary circuit, said first junction of said current source being the tap of said first slidewire, said second junction of said current source being any location in said resistance network other than said slidewire taps and said second slidewise, a transducer connected in series with a voltage-null detector in opposition to said resistance network at two points, one of said points being the tap of said second slidewire, the other of said points being any location in the resistance network other than said slidewire taps and said first slidewire, said transducer developing an E. M. F. as a quadratic function of said second physical phenomenon, and means electrically connected to said subsidiary circuit for obtaining an E. M. F. measurement in direct proportion to the product of said first and second phenomena.

7. An electrical computing measuring apparatus for the measurement of fluid flow comprising in combination a resistance network consisting of first and second linear slidewires each provided with a tap, the physically adjustable elements of said slidewires being ganged by a linear mechanical coupling, first conductive means of resistance negligible as compared to the resistances of said slidewires connected between one end of said first slidewire and one end of said second slidewire, and second conductive means of resistance negligible as compared to the resistances of said slidewires connected between the other ends of said slidewires, a current source connected to said resistance network through two junctions, one junction being the tap of said first slidewire, the other junction being any location other than the slidewire taps and said second slidewire, the current supplied by said source being substantially independent in magnitude for all variations of resistance of said resistance network, and a transducer connected in series with a voltage-null detector in electrical opposition to said resistance network at two points, one point being the tap of said second slidewire, the other point being any location in the resistance network other than the slidewire taps and said first slidewire, said transducer developing an output E. M. F. as a quadratic function of the fluid flow under determination.

8. An electrical computing measuring apparatus for the measurement of fluid flow according to claim 7 provided with a resistor connected to said first and second conductive means in shunt relationship to said slidewires having a coefficient of resistance such that the current through said second slidewire is substantially inversely proportional to the density of the measured fluid.

No references cited.

U. S. DEPARTMENT OF COMMERCE
PATENT OFFICE

CERTIFICATE OF CORRECTION

Patent No. 2,836,357     Paul C. Hoell     May 27, 1958

It is hereby certified that error appears in the printed specification of the above numbered patent requiring correction and that the said Letters Patent should read as corrected below.

Column 12, line 70, following the equation insert -- where --; column 13, line 22, for "compensation" read -- compensations --; line 43, for "may types" read -- many types --; column 16, line 67, for "where at" read --where a --; column 17, line 56, for "apparatus to" read -- apparatus of --; column 18, line 45, for "to said" read -- of said --; column 20, line 13, for "slidewise" read -- slidewire --.

Signed and sealed this 29th day of July 1958.

(SEAL)
Attest:

KARL H. AXLINE                                         ROBERT C. WATSON
Attesting Officer                            Commissioner of Patents